(12) United States Patent
Goldswain et al.

(10) Patent No.: US 10,871,167 B2
(45) Date of Patent: Dec. 22, 2020

(54) REDUCED EMISSION GAS SEAL

(71) Applicant: John Crane UK Ltd., Slough, Berkshire (GB)

(72) Inventors: Ian Martyn Goldswain, Berkshire (GB); Kanza Amanullah, Essex (GB); Raphael Rouillon, Berkshire (GB)

(73) Assignee: JOHN CRANE UK LTD., Slough (GB)

( * ) Notice: Subject to any disclaimer, the term of this patent is extended or adjusted under 35 U.S.C. 154(b) by 46 days.

(21) Appl. No.: 16/356,433

(22) Filed: Mar. 18, 2019

(65) Prior Publication Data

US 2019/0211835 A1    Jul. 11, 2019

Related U.S. Application Data

(63) Continuation of application No. 15/618,579, filed on Jun. 9, 2017, now Pat. No. 10,247,194.

(60) Provisional application No. 62/348,551, filed on Jun. 10, 2016.

(51) Int. Cl.
    *F04D 29/12*   (2006.01)
    *F16J 15/34*   (2006.01)
    *F01D 11/00*   (2006.01)

(52) U.S. Cl.
    CPC .......... *F04D 29/124* (2013.01); *F16J 15/342* (2013.01); *F16J 15/3404* (2013.01); *F16J 15/3484* (2013.01); *F01D 11/003* (2013.01); *F04D 29/122* (2013.01)

(58) Field of Classification Search
    CPC .... F01D 11/003; F04D 29/104; F04D 29/108; F04D 29/124; F16J 15/3404; F16J 15/3412; F16J 15/342; F16J 15/3484; F16J 15/40; F05D 2240/55
    See application file for complete search history.

(56) References Cited

U.S. PATENT DOCUMENTS

| | | | |
|---|---|---|---|
| 3,449,653 | A | 6/1969 | Koppelmann |
| 4,212,475 | A | 7/1980 | Sedly |
| 5,217,233 | A | 6/1993 | Pecht et al. |
| 5,222,743 | A | 6/1993 | Goldswain et al. |

(Continued)

FOREIGN PATENT DOCUMENTS

| | | |
|---|---|---|
| CN | 1051416 A | 5/1991 |
| CN | 1085636 A | 4/1994 |

(Continued)

OTHER PUBLICATIONS

Supplementary European Search Report for Application No. EP17811110.0, dated Jan. 15, 2020, 9 pages.

(Continued)

*Primary Examiner* — Nicholas L Foster
(74) *Attorney, Agent, or Firm* — Cantor Colburn LLP

(57) ABSTRACT

A dry gas mechanical seal system configured to inhibit the emission of process gas. The mechanical seal system having tandem first and second stage seals, and a single separation gas supply subsystem configured to direct a supply of separation gas from an inlet through interfacing portions of the first stage seal into a process cavity and from the inlet through the interfacing portions of the second stage seal and out through an outlet to the atmosphere, thereby inhibiting the emission of process gas between a compressor housing and a rotating compressor shaft.

30 Claims, 5 Drawing Sheets

(56) References Cited

U.S. PATENT DOCUMENTS

| | | | |
|---|---|---|---|
| 5,421,593 A | 6/1995 | Aritsubo et al. | |
| 5,490,679 A | 2/1996 | Borrino et al. | |
| 5,496,047 A | 3/1996 | Goldswain et al. | |
| 5,498,007 A | 3/1996 | Kulkarni et al. | |
| 5,529,315 A | 6/1996 | Borrino et al. | |
| 5,681,047 A | 10/1997 | Klostermann et al. | |
| 5,713,576 A | 2/1998 | Wasser et al. | |
| 5,924,697 A | 7/1999 | Parker et al. | |
| 5,938,206 A | 8/1999 | Klosterman et al. | |
| 5,941,531 A | 8/1999 | Parker et al. | |
| 6,109,617 A | 8/2000 | Laney | |
| 6,210,107 B1 | 4/2001 | Volden et al. | |
| 6,524,059 B1 | 2/2003 | Nogiwa | |
| 6,655,693 B2 | 12/2003 | Hosanna et al. | |
| 6,905,123 B2 | 6/2005 | Goldswain | |
| 8,651,801 B2 | 2/2014 | Shamseldin et al. | |
| 9,790,952 B2* | 10/2017 | Shamseldin | F04D 29/124 |
| 10,247,194 B2* | 4/2019 | Goldswain | F04D 29/122 |
| 2009/0290971 A1 | 11/2009 | Shamseldin et al. | |
| 2012/0171052 A1 | 7/2012 | Gachetti | |
| 2014/0161587 A1 | 6/2014 | Shamseldin et al. | |
| 2014/0321972 A1 | 10/2014 | Del Vescovo et al. | |
| 2017/0356453 A1* | 12/2017 | Goldswain | F04D 29/124 |

FOREIGN PATENT DOCUMENTS

| | | |
|---|---|---|
| CN | 1245552 A | 2/2000 |
| CN | 101749429 A | 6/2010 |
| EP | 0819873 | 1/1998 |
| JP | H11344125 A | 12/1999 |

OTHER PUBLICATIONS

Engineer's Notes: Supersonic Ejectors for Hydrocarbon Emissions Capture, Insights, p. 17 (Autumn 2011), 8 pages.
International Preliminary Report on Patentability for International Application No. PCT/US2017036826, dated Oct. 17, 2018, 12 pages.
Search Report and Written Opinion dated Sep. 7, 2017 for PCT Application No. PCT/US2017/036826, 16 pages.
China Office Action for Application No. 201780046709.7, dated Nov. 28, 2019, 5 pages, (English Translation).
China Search for Application No. 201780046709.7, dated: Nov. 28, 2019, 3pages, (English Translation).
Chinese Office Action for Patent Application No. 201780046709.7 dated Jun. 24, 2020, 8 pages.
Translation of Chinese Office Action for Patent Application No. 201780046709.7 dated Jun. 24, 2020, 3 pages.

* cited by examiner

REDUCED EMISSION GAS SEAL

RELATED APPLICATIONS

This application is a continuation of application Ser. No. 15/618,579 filed Jun. 9, 2017, which claims the benefit of U.S. Provisional Application No. 62/348,551 filed Jun. 10, 2016, each of which are incorporated by reference herein.

TECHNICAL FIELD

The present disclosure relates to mechanical seals, and more particularly to non-contacting, gas lubricated seals for rotating components.

BACKGROUND

In the petrochemical industry, centrifugal compressors may be located at intervals along a natural gas pipeline to boost the gas pressure for processing, to counter the effect of flow losses along the transmission pipelines and to generally keep the gas moving towards its destination. These compressors can be used upstream (during exploration and production), midstream (during processing, storage and transportation), or downstream (during natural gas/and petrochemical refining, transmission and distribution) in a petrochemical process. These centrifugal compressors can also be used to transport other fluids.

To move natural gas or other fluids, centrifugal compressors use a rotating disk or impeller in a shaped housing to force the gas to the rim of the impeller, thereby increasing the velocity of the gas. A diffuser (divergent duct) converts the velocity energy to pressure energy.

Dry gas seals may be used to reduce frictional wear on the rotating components while preventing leakage of the centrifuged or processed gas. To further inhibit leakage of processed gas into the atmosphere, some centrifugal compressors can include a pair of dry gas seals working in tandem. One example of such a mechanical seal system is described in U.S. Pat. No. 8,651,801, the contents of which are incorporated by reference herein.

Referring to FIG. 1, a partial cross-sectional view of the tandem non-contacting dry gas seal arrangement 100 of the '801 patent is depicted. At least a portion of the seal arrangement 100 is positioned between a rotating compressor shaft 102 and a compressor housing 104. The rotating compressor shaft 102 is operably coupled to a compressor impeller (not shown) disposed in a process cavity 106 of the compressor, and is supported by the housing 104 via a bearing (not shown) disposed in a bearing cavity 108 of the housing 104. A bore 110 formed in the compressor housing 104 extends between the process cavity 106 and the bearing cavity 108 and defines an annular seal chamber 112. A shroud or labyrinth seal 114, which extends over a radially extending opening formed between the rotating compressor shaft 102 and the compressor housing 104, inhibits the free flow of process gas from the process cavity 106 into the bore 110.

Process gas present in the process cavity 106, which can reach pressures of 6500 psig (450 bar-g), is sealed from the bearing cavity 108 and the atmosphere or surrounding environment by a first stage seal 116 and a second stage seal 118. The first stage seal 116 includes a rotating ring 120 (alternatively referred to as a mating ring) operably coupled to rotating compressor shaft 102 via sleeve 122. Rotating ring 120 defines a radial seal face 124 in relatively rotatable sealing relation with a radial seal face 126 of a non-rotating or stationary ring 128 (alternatively referred to as a primary ring). The stationary ring 128 is operably coupled to the compressor housing 104 via a biasing spring 130 and a spring carrier ring 132, thereby enabling axial movement of the stationary ring 128 relative to the rotating ring 120, so as to enable dimensional changes in the gap width between the rotating and stationary seal faces 124, 126. Generally, the biasing spring 130 in the spring carrier ring 132 biases the stationary ring 128 towards the rotating ring 120. A pressurized gas introduced between the seal faces 124, 126 presents a counteracting force against the biasing spring 130 to increase the gap width between the seal faces 124, 126, so as to enable effective sealing while inhibiting frictional wear of the seal faces 124, 126 to enhance durability. The second stage seal 118 is constructed in a similar manner.

During operation, a flow of diverted process gas referred to as "sealing gas" is provided to the first stage seal 116. The diverted process gas is generally filtered and treated in a gas conditioning unit (not shown), for example by heating and/or drying the process gas to remove vapor particles and liquids, prior to delivery to the first stage seal 116. Once properly conditioned, the sealing gas, which is usually pressurized at or above the pressure of the process gas in the process cavity 106, flows through an inlet 134, into a chamber 136, through the first stage seal 116, into a chamber 138, and out through an outlet 140. Additionally, due to the pressure differential, a portion of the sealing gas typically flows past the labyrinth seal 114 and into the process cavity 106, thus creating a gas flow in a direction that prevents unfiltered and untreated process gas from entering the annular seal chamber 112.

In a similar manner, a "barrier gas," which is typically an inert gas such as nitrogen ($N_2$), is provided to the second stage seal 118. The barrier gas, which is usually pressurized to a pressure slightly higher than the pressure of the gases in the chamber 138, flows through an inlet 142, into a chamber 144, through second stage seal 118, into a chamber 146, and out through an outlet 148. Additionally, a portion of the barrier gas flows from the chamber 144 to the chamber 138, and out through the outlet 140 with the sealing gas.

In some seal arrangements, an additional gas seal 150, referred to as a "separation gas seal" can be configured to isolate the annular seal chamber 112 from oil within the bearing chamber 108. The separation gas flows through inlet 152, through the separation gas seal 150, into a chamber 146, and out through an outlet 148.

The portion of the flow of the filtered and treated process gas (sealing gas), which in some cases is natural gas consisting mostly of methane, exits through the outlet 140 and often a portion of it is ported directly to the atmosphere. This leakage, which is typically around eight standard cubic feet per minute (SCFM) per centrifugal compressor, has been considered by the industry to be an acceptable amount.

Methane ($CH_4$) is a greenhouse gas that has been shown to adversely affect climate change. Recent years have seen rising levels of methane emissions to the atmosphere due to increasing availability of natural gas resources coupled with aging natural gas distribution systems. Presently, it is estimated that 20% of methane leaks occur within natural gas distribution systems. Centrifugal compressor leakage is one of the largest sources of methane emissions in natural gas distribution systems. According to some estimates, compressor emissions account for roughly 500 metric tons of methane leakage per annum per facility.

A system that further reduces the emission of natural gas or other process gases to the atmosphere, without requiring a costly replacement of numerous centrifugal compressor components, would provide a distinct advantage over conventional systems presently used in the natural gas industry.

SUMMARY

Embodiments of the present disclosure provide a dry gas seal system configured to pump a separating gas upstream into the process chamber, thereby reversing the normal flow of gas across the first seal stage for the purpose of minimizing the emission of process gas leakage between a compressor housing and rotating compressor shaft of the dry gas seal system to near zero levels. The dry gas seal system utilizes a low-pressure clean, inert gas in place of conditioned methane or other process gas. Through rotation of a grooved rotating ring of a first stage seal, the inert gas is pressurized to a pressure higher than that of the process gas, thereby enabling a flow of the inert gas into the process gas, such that little to no process gas is vented or leaked to the atmosphere or surrounding environment. Accordingly, embodiments of the present disclosure provide a more environmentally friendly centrifugal compressor seal system that serves to decrease methane production losses.

One embodiment of the present disclosure provides a tandem, non-contacting dry gas mechanical seal system for a compressor configured to inhibit the emission of process gas between a stationary compressor housing and a rotating compressor shaft. The mechanical seal system can include a first stage seal, a second stage seal and a single separation gas supply subsystem. The first stage seal can include a first rotating ring operably coupled to the compressor shaft, and a first stationary ring operably biased towards the first rotating ring by a first biasing mechanism operably coupled to the compressor housing. The first rotating ring can define spiral shaped grooves configured to pressurize gas passing between the interfacing portions of the first rotating ring and the first stationary ring to partially counteract the biasing force of the first biasing mechanism. The second stage seal can include a second rotating ring operably coupled to the compressor shaft, and a second stationary ring operably biased towards the second rotating ring by a second biasing mechanism operably coupled to the compressor housing. The interfacing portions of the second rotating ring and the second stationary ring can be configured to pressurize gas passing between the interfacing portions to partially counteract the biasing force of the second biasing mechanism. The single separation gas supply subsystem can be configured to direct a supply of separation gas from an inlet to interfacing portions of the first stage seal and into a process cavity, and from the inlet through the interfacing portions of the second stage seal and out through an outlet to the atmosphere, thereby inhibiting the emission of process gas between the compressor housing and rotating compressor shaft.

Another embodiment of the present disclosure provides a non-contacting dry gas mechanical seal system for a compressor configured to inhibit the emission of process gas between a stationary compressor housing and a rotating compressor. The mechanical seal system can include a mechanical seal and a separation gas supply subsystem. The mechanical seal can include a rotating ring operably coupled to the compressor shaft, and a stationary ring operably biased towards the first rotating ring by a biasing mechanism operably coupled to the compressor housing. The rotating ring can define grooves configured to pressurize gas passing between the interfacing portions of the rotating ring and the stationary ring to partially counteract the biasing force of the biasing mechanism. The separation gas supply subsystem can be configured to direct a supply of separation gas from an inlet through interfacing portions of the mechanical seal and into a process cavity.

Another embodiment of the present disclosure provides a method of inhibiting the emission of process gas between a stationary compressor housing and a rotating compressor shaft with a mechanical seal system. The method can comprise the steps of: providing a mechanical seal system having a first stage seal including a first rotating ring operably coupled to the compressor shaft, and a first stationary ring operably biased towards the first rotating ring by a first biasing mechanism operably coupled to the compressor housing, the first rotating ring and defining spiral shaped grooves configured to pressurize gas passing between interfacing portions of the first rotating ring and the first stationary ring to partially counteract the biasing force of the first biasing mechanism, a second stage seal including a second rotating ring operably coupled to the compressor shaft, and a second stationary ring operably biased towards the second rotating ring by a second biasing mechanism operably coupled to the compressor housing, the interfacing portions of the second rotating ring and the second stationary ring configured to pressurize gas passing between the interfacing portions to partially counteract the biasing force of the second biasing mechanism, and a single separation gas supply subsystem; directing a supply of separation gas through a single inlet of the separation gas supply subsystem; diverting the supply of separation gas, such that a first portion passes through the interfacing portions of the first stage seal, and a second portion passes through the interfacing portions of the second stage seal; and venting the first portion of the supply separation gas into a process cavity of the compressor housing to co-mingle with process gases, thereby inhibiting the emission of process gas.

Embodiments of the present disclosure can also be implemented in other industrial segments, for example, where greenhouse gases are compressed for Enhanced Oil Recovery (EOR) compression of carbon dioxide.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

Figure 1:
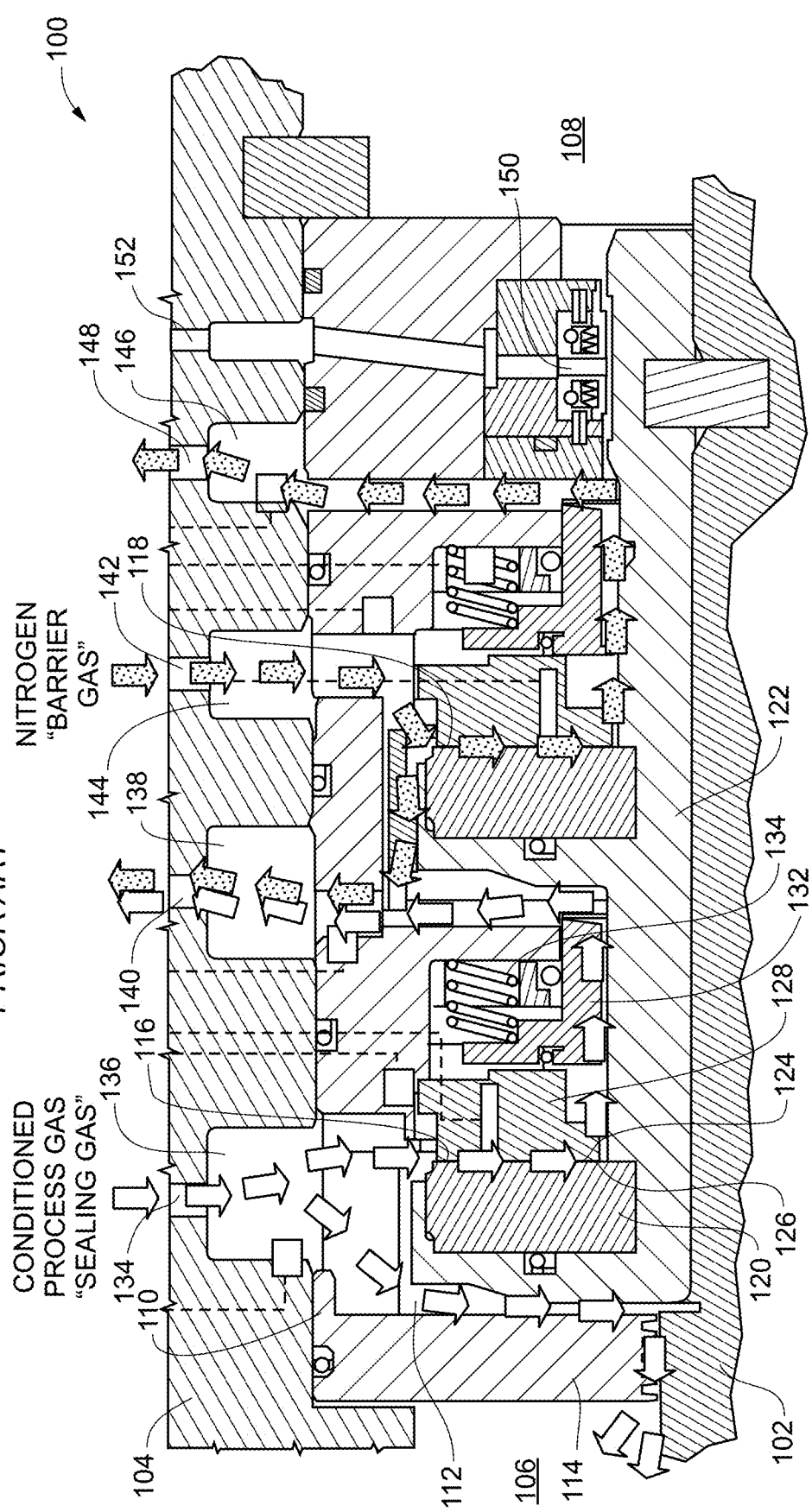
FIG. 1 is a partial, cross sectional view depicting a tandem, non-contacting dry gas seal arrangement of the prior art.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Figure 2:
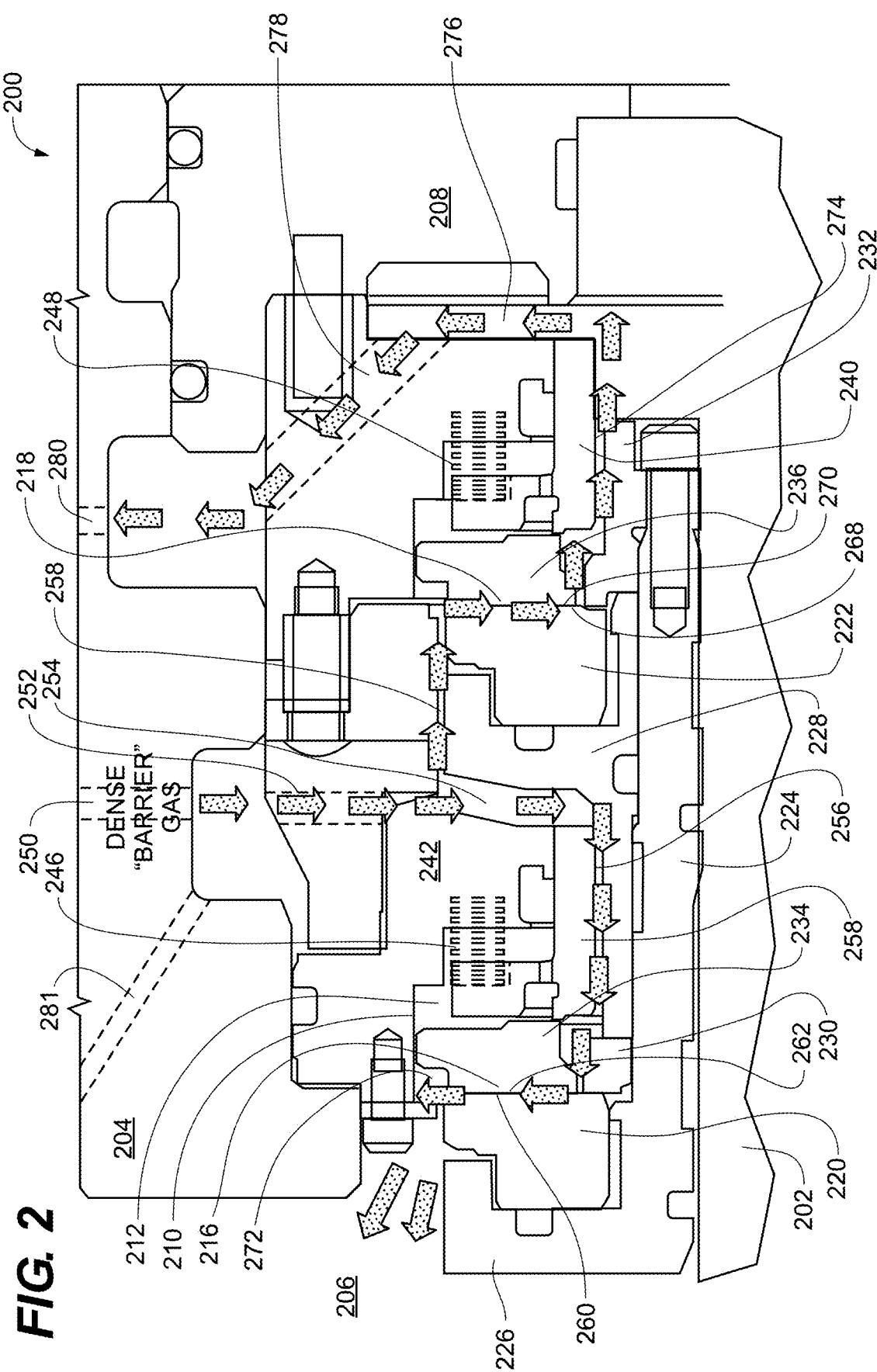
FIG. 2 is a partial, cross-sectional view depicting a tandem, non-contacting dry gas mechanical seal system in accordance with an embodiment of the disclosure.
Figure 3A:
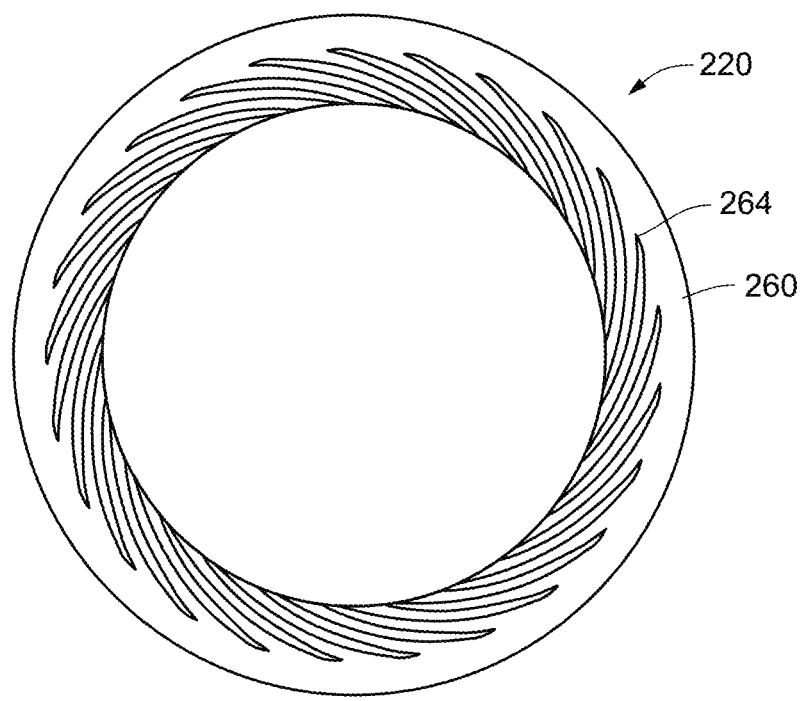
FIG. 3A is a plan view depicting a sealing face of a rotating ring of a first stage seal in accordance with a first embodiment of the disclosure.
Figure 3B:
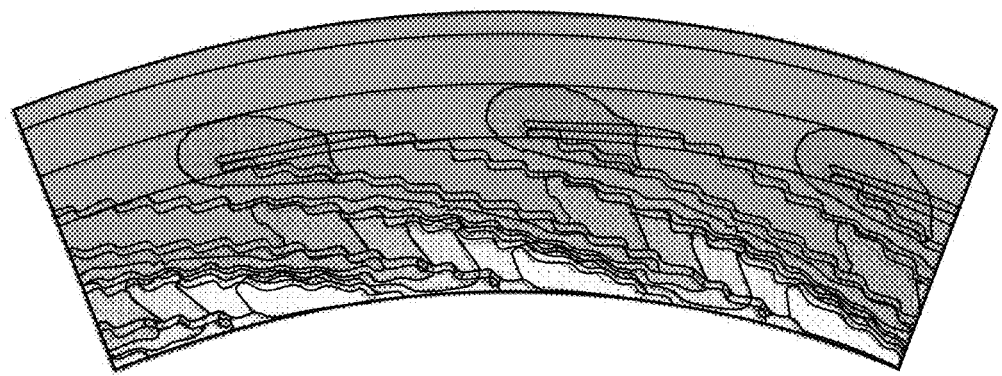
FIG. 3B is a partial plan view of the rotating ring of FIG. 3A, in which a pressure gradient is graphically depicted across the sealing face.
Figure 3B:
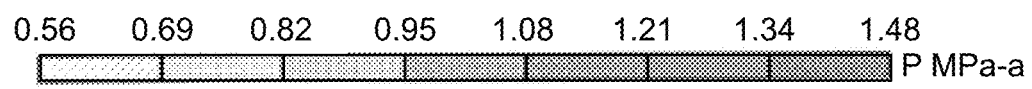

Referring to FIG. 2, a partial, cross-sectional view of a tandem, non-contacting dry gas mechanical seal system 200 is depicted in accordance with an embodiment of the disclosure. In one embodiment, the mechanical seal system is at least partially mounted within the space defined between a rotating compressor shaft 202 and a stationary compressor housing 204. The rotating compressor shaft 202 can be operably coupled to a compressor impeller (not shown) disposed in a process cavity 206 of the mechanical seal system 200, and can be supported by the housing 204 via a bearing (not shown) in a bearing cavity 208 of the housing 204. A bore 210 formed in the housing 204 extends between the process cavity 206 and the bearing cavity 208 and defines an annular seal chamber 212. Process gas present in the process cavity 206 can be sealed from the bearing cavity 208 and the environment by a first stage seal 216 and a second stage seal 218. While mechanical seal system 200 is depicted and described with two seal stages 216, 218, a greater or fewer number of seal stages is contemplated. Additionally, in some embodiments, a shroud or labyrinth seal can extend over a radial opening formed between the rotating compressor shaft 202 and the compressor housing 204, thereby further inhibiting the free flow of process gas from the process cavity 206 into the annular seal chamber 212 and the environment.

The first and second stage seals 216, 218 can include rotating rings 220, 222, operably coupled to the rotating compressor shaft 202. In one embodiment, the rotating rings 220, 222 are operably coupled to a sleeve member 224, which is in turn operably coupled to the rotating compressor shaft 202. Sleeve member 224 can include a first flange formation 226 configured to retain a portion of the rotating ring 220 and a second flange formation 228 configured to retain a portion of the rotating ring 222. In one embodiment, the second flange formation 228 is formed independently from the sleeve member 224, such that the second flanged formation 228 can slide axially relative to the sleeve member 224. In one embodiment, annular members 230 and 232 can be positioned along the sleeve member 224 as an aid to retaining the rotating ring 220, the second flange formation 228, and the rotating ring 222 in their desired positions. Accordingly, the sleeve member 224, the first flange formation 226, the second flange formation 228, the annular member 230, the annular member 232, the rotating ring 220, and the rotating ring 222, collectively referred to as the rotating members, rotate along with the compressor shaft 202.

The first and second stage seals 216, 218 can also include stationary rings 234, 236 operably coupled to the compressor housing 204. In one embodiment, a first carrier ring 238 configured to retain a portion of the stationary ring 234 can be operably coupled to a first annular member 242 via a first biasing mechanism 246, which in one embodiment can be a spring assembly (as depicted in FIG. 2). A second carrier ring 240 configured to retain a portion of the stationary ring 236 can be operably coupled to a second annular member 244 via a second biasing mechanism 248, which in one embodiment can be a spring assembly (as depicted in FIG. 2). Accordingly, the first carrier ring 238, the second carrier ring 240, the first annular member 242, the second annular member 244, the first biasing mechanism 246, the second biasing mechanism 248, the stationary ring 234, and the stationary ring 236, collectively referred to as the non-rotational or stationary members, maintain their position relative to the compressor housing 204.

A fluidic path can be defined between the rotating members and the stationary members, through which a barrier gas can flow (as depicted in FIG. 2 by a series of arrows). The barrier gas can be any appropriately dense gas, such as carbon dioxide ($CO_2$), nitrogen ($N_2$), air, or other gases. The barrier gas can be introduced into the fluidic path via a barrier gas inlet 250. Thereafter, the barrier gas can flow through a conduit 252 and into a chamber 254, where it can be divided into a first barrier gas flow and a second barrier gas flow. The first barrier gas flow can flow through a conduit 256 to the first stage seal 216. The second barrier gas flow can flow through a conduit 258 to the second stage seal 218.

The rotating ring 220 and the stationary ring 234 of the first stage seal 216 can include a respective rotating radial seal face 260 and a stationary radial seal face 262. The rotating radial seal face 260 can be positioned adjacent to the stationary radial seal face 262, such that the faces 260, 262 are in abutting contact when the mechanical seal system 200 is not in operation, and a narrow, self-regulating gap enabling the passage of gas (typically measuring between 1-3 µm in width) is defined between the faces 260, 262 when the mechanical seal 200 is in operation. The first carrier ring 238 and the first biasing mechanism 246 can be configured to enable axial movement of the stationary ring 234 relative to the compressor housing 204 so as to enable dimensional changes in the gap width between the rotating seal face 260 and the stationary seal face 262. In one embodiment, the first biasing mechanism 246 biases the stationary ring 234 towards the rotating ring 220. A pressurized gas introduced between the seal faces 260, 262 presents a counteracting force against the bias of the first biasing mechanism 246 to increase the gap width between the seal faces 260, 262, so as to enable effective sealing while inhibiting frictional wear of the seal faces 260, 262 to enhance durability.

Figure 4A:
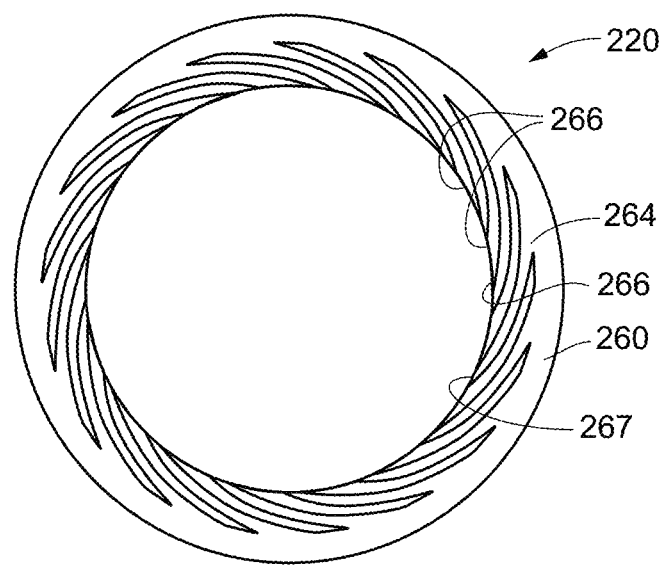
FIG. 4A is a plan view depicting a sealing face of a rotating ring of a first stage seal in accordance with a second embodiment of the disclosure.
Figure 4B:
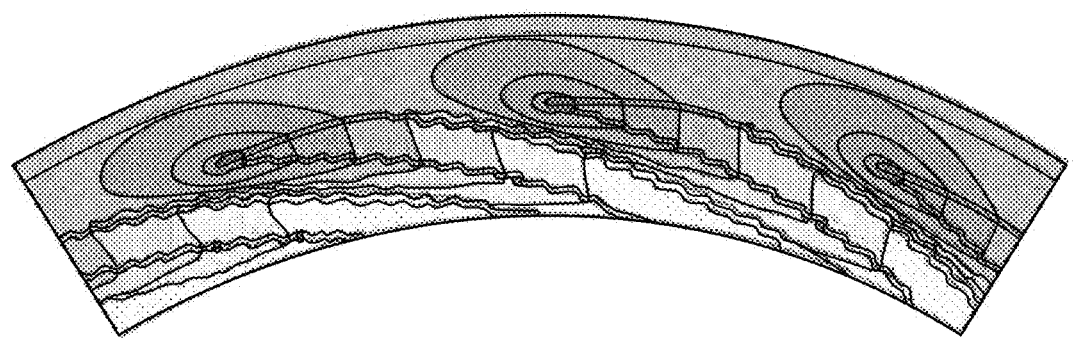
FIG. 4B is a partial plan view of the rotating ring of FIG. 4A, in which a pressure gradient is graphically depicted across the sealing face.
Figure 4B:
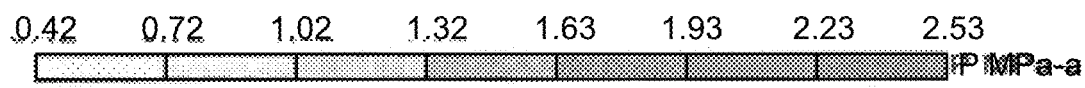
Figure 5A:
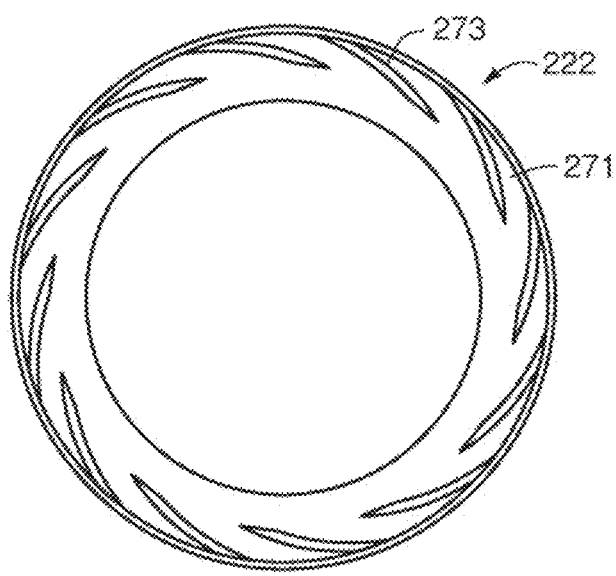
FIG. 5A-D are plan views depicting a sealing face of a rotating ring of a second stage seal in accordance with an embodiment of the disclosure.
Figure 5B:
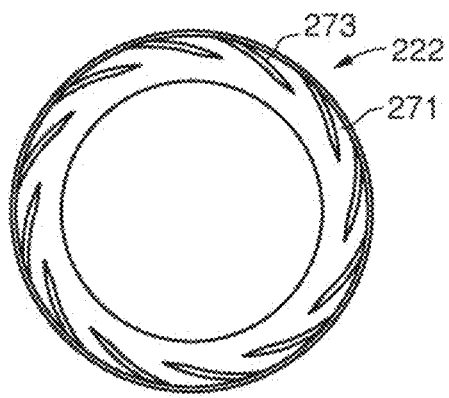
Figure 5C:
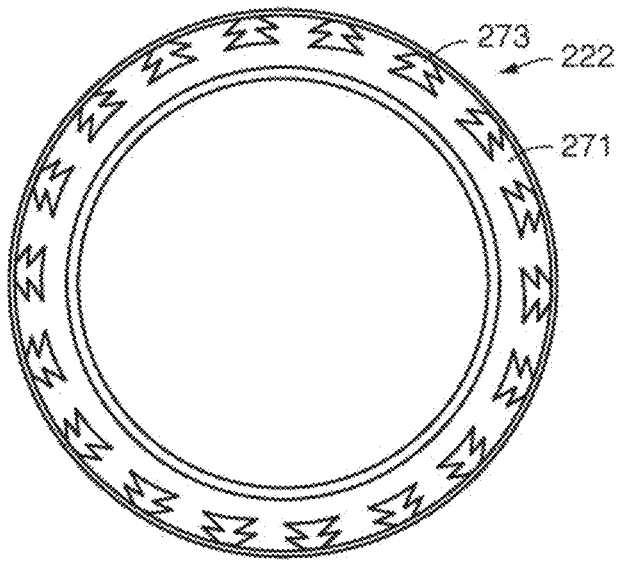
Figure 5D:
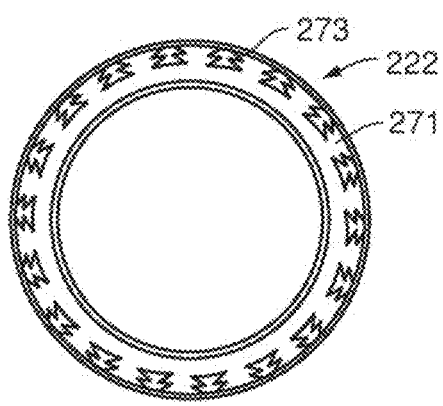

Referring to FIGS. 3A-4B, embodiments of the rotating ring 220 are depicted in accordance with the disclosure. In one embodiment, a grooved area 264 is provided on the inner portion of the sealing face 260, such that barrier gas can flow between faces 260 and 262 and a barrier gas pressure can be sustained within the gap between the faces 260, 262 sufficient to oppose the bias of the stationary radial seal face 262 towards the rotating seal face 260 by the first biasing mechanism 246, thereby creating a barrier gas cushion to lubricate the seal faces 260, 262 and enable sealing. In one embodiment, the one or more grooved areas of seal faces 260, 262 are configured to promote the flow of separation gas from an inner diameter of the first stage seal 216 to an outer annular diameter of the first stage seal 216 (as depicted in FIG. 2). In particular, the grooves 266 can be defined to open to an inner diameter 267 of the rotating ring 220, so as to permit a hydrostatic lift so as at least partially to cause separation between the faces 260, 262 before the rotating ring reaches a full rotational speed if/when a pressurized gas enters the grooves from the inner diameter 267. In one embodiment, the grooves 266 of the grooved area 264 can define spiral shapes configured to create a pressure gradient across the sealing face 260 when the rotating ring 220 is rotating (as depicted in FIGS. 3B and 4B). Accordingly, fluid pressure of the barrier gas can be boosted using a small amount of kinetic energy of the rotating compressor shaft 202 via fluid interaction with the specially shaped spiral grooves 266, thereby permitting a hydrodynamic lift, thereby maintaining a separation between the faces 260, 262. In other embodiments, other configurations of the grooved area 264 are contemplated. In another embodiment, the grooved area 264 can be located on the stationary ring 234.

Referring to FIGS. 5A-D, embodiments of the rotating ring 222 of the second stage seal 218 are depicted in accordance with the disclosure. The rotating ring 222 and the stationary ring 236 of the second stage seal 218 can include a respective rotating radial seal face 268 and a stationary radial seal face 270. The rotating radial seal face 268 can be positioned adjacent to the stationary radial seal face 270, such that the faces 268, 270 are in abutting contact when the mechanical seal system 200 is not in operation, and a narrow gap enabling the passage of gas is defined between the faces 268, 270 when the mechanical seal 200 is in operation. The second carrier ring 240 and the second biasing mechanism 248 can be configured to enable axial movement of the stationary ring 236 relative to the compressor housing 204 so as to enable dimensional changes in the gap width between the rotating seal face 268 and stationary seal face 270. In one embodiment, second biasing mechanism 248 biases the stationary ring 236 towards the rotating ring 222. A pressurized gas introduced between the seal faces 268, 270 presents a counteracting force against the bias of the second biasing mechanism 248 to increase the gap width between the seal faces 268, 270, so as to enable effective sealing while inhibiting frictional wear of the seal faces 268, 270 to enhance durability.

In one embodiment, either or both of the seal faces 268, 270 can include a grooved area 271 configured to enhance pressure generation capabilities and improve flow of the barrier gas therebetween. Grooves 273 of the grooved area 271 can define spiral or arrow shapes, such as those described in U.S. Pat. Nos. 4,212,475 and 6,655,693, the contents of which are incorporated by reference herein. In one embodiment, the one or more grooved areas 271 of seal faces 268, 270 are configured to promote the flow of gas from an outer annular diameter of the second stage seal 218 to an inner diameter of the second stage seal 218 (as depicted in FIG. 2). In other embodiments, the one or more grooved areas 271 of the seal faces 268, 270 can be configured to permit the flow of separation gas in either direction.

After passing through the first stage seal 216, the first barrier gas flow can flow into a chamber 272, and into the process cavity 206. Additionally, after passing through the second stage seal 218, the second barrier gas flow can flow into a conduit 274, a chamber 276, a conduit 278, and out of the compressor housing 204 through barrier gas outlet 280, thereby co-mingling and/or mixing with the process gas. In one embodiment, barrier gas can be collected and/or reconditioned, thereby creating a closed-loop to reduce the need for an additional supply of barrier gas. In other embodiments, the barrier gas can be vented to the atmosphere and/or introduced as compressed air into a fuel mixture for a combustion motor powering rotation of the compressor shaft 202.

In operation, the flow of barrier gas is introduced into the compressor housing 204 via barrier gas inlet 250 at a lower relative pressure than the pressure of the gases within the process cavity 206, for example at a pressure between 10-50 bar. The barrier gas flows along conduit 252 and enters chamber 254, where it separates into a first barrier gas flow and a second barrier gas flow. The first barrier gas flow continues along conduit 256 towards the first stage seal 216, while the second barrier gas flow continues along conduit 258 towards the second stage seal 218.

When the compressor shaft 202 is rotating, the respective grooves 266 of the first stage seal 216 and the grooves 273 second stage seal 218 create a pressure gradient to encourage the flow of barrier gas from the barrier gas inlet 250 to the respective first and second stage seals 216, 218. However, because of the lower relative pressure of the barrier gas than the gases within the process cavity 206, one or more additional steps may be taken to equalize the pressure on both sides of the first stage seal 216 and/or provide artificial hydrostatic lifting, so as to provide an initial gap between sealing faces 260, 262, until the first rotating ring 220 reaches a rotational speed at which the interface gap can be sustained. For example, in one embodiment, the barrier gas inlet 250 can be at least partially closed or blocked so as to enable process gas to leak through the first seal 216, thereby raising the pressure within conduit 256 so as to decrease the pressure gradient across the first stage seal 216. In another embodiment, the mechanical seal system 200 can include a pressure balance line 281 configured to enable a flow of process gas into conduit 256, so as to decrease the pressure gradient across the first stage seal 216. In yet another embodiment, the mechanical seal system 200 can include an actuator configured to create a mechanical separation between the seal faces 260, 262 of the first stage seal 216, thereby artificially providing an initial hydrostatic lift (as disclosed in U.S. Patent Application Ser. No. 62/506,196 filed May 15, 2017, the contents of which are incorporated by reference herein). A minimal leakage of process gas can occur until the first rotating ring 220 reaches a rotational speed at which the interface gap can be sustained and the barrier gas inlet 250 is opened, the pressure balance line 281 is closed, and/or the actuator is deenergized. Leakage can be minimized by containing the process gas within the mechanical seal system 200, such that the process gas that enters conduit 256 flows back into the process chamber 206 through the first stage seal 216.

As the first barrier gas flow passes through the radial seal faces 260, 262 of the first stage seal 216, the pressure is increased until it meets or exceeds the pressure of the gas within the process cavity 206. The flow of the barrier gas through the seal faces 260, 262 provides a cushion between the seal faces 260, 262, thereby lubricating the first stage seal 216 and inhibiting contact between the seal faces 260, 262. Because the barrier gas is pressurized to a pressure that exceeds the pressure of the gas within the process cavity 206, the first barrier gas flow continues into the process cavity 206, thereby mixing with the process gas therein. Accordingly, the flow of barrier gas into the process cavity 206 represents a reversal of the flow direction in conventional dry gas seal arrangements, where process gas would normally flow from the process chamber 206, through the first stage seal 216, and out to the atmosphere.

As the second barrier gas flow passes through radial seal faces 268, 270 of the second stage seal 218, the pressure of the barrier gas is increased so as to provide a lubricating cushion between the seal faces 268, 270. After passing between the seal faces 268, 270, the second barrier gas flow continues along conduit 274, into chamber 276, along conduit 278, and out of the compressor housing 204 via barrier gas outlet 280. At the barrier gas outlet 280, the second barrier gas flow can be vented to the atmosphere, recycled back into the separating gas supply, or mixed with fuel gas powering the compressor. Thus, the flow of barrier gas through the second stage seal 218 serves as a backup in the event of a failure of the first stage seal 218.

The upstream flow of the barrier gas through the first stage seal 216 into the process cavity 206 provides numerous advantages. In particular, because the process gas is not used as the barrier gas, a gas conditioning unit, which serves to remove moisture and contaminants from the process gas to enable proper lubrication and inhibit corrosion, is not required. In addition, the process gas is forced, by the pressure of the first barrier gas flow back into the process chamber 206, therefore inhibiting the venting of process gas to the surrounding environment. Accordingly, embodiments of the present disclosure provide a more environmentally friendly mechanical seal system 200 that serves to decrease methane production losses. Numerous other advantages will be apparent to those of ordinary skill in the art.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A mechanical seal system for a compressor operating on a process gas in a process cavity at a process cavity pressure, the mechanical seal system comprising:
   a mechanical seal including a rotating ring operably coupled to a compressor shaft, and a stationary ring operably biased towards the rotating ring by a biasing mechanism operably, coupled to a compressor housing, the rotating ring defining grooves that during normal operation are configured to pressurize gas passing between interfacing portions of the rotating ring and the stationary ring to partially counteract a biasing force of the biasing mechanism;
   a dense barrier gas supply subsystem configured to direct a supply of dense barrier gas from an inlet through the interfacing portions of the rotating ring and the stationary ring at a pressure below the process cavity pressure, during normal operation the grooves of the mechanical seal configured to pressurize the dense barrier gas to a pressure above the process cavity pressure to promote an upstream flow of the dense barrier gas from an inner diameter of the mechanical seal to an outer diameter of the mechanical seal and into the process cavity and to maintain an interface gap between the interfacing portions of the rotating ring and the stationary ring; and
   a starting mechanism configured to supply an additional supply gas into the interfacing portions of the rotating ring and the stationary ring during a starting operation to provide an initial gap between the interfacing portions until the rotating ring reaches a rotational speed at which the interface gap between the interfacing portions is sustainable.

2. The mechanical seal system of claim 1, wherein the starting mechanism includes a pressure balance line, separate from the inlet of the dense barrier gas supply subsystem, configured to enable a flow of process gas into the interfacing portions of the rotating ring and the stationary ring during the starting operation.

3. The mechanical seal system of claim 2, wherein the pressure balance line is closed after the starting operation.

4. The mechanical seal system of claim 1, wherein the starting mechanism includes an actuator configured to create a mechanical separation between the interfacing portions of the rotating ring and the stationary ring during the starting operation, thereby artificially providing the initial gap between the interfacing portions until the rotating ring reaches a rotational speed at which the interface gap between the interfacing portions is sustainable.

5. The mechanical seal system of claim 1, wherein the inlet of the dense barrier gas supply subsystem is at least partially closed during the starting operation.

6. The mechanical seal system of claim 1, wherein the dense barrier gas supply subsystem includes a harrier gas outlet configured to enable the dense barrier gas to be one of vented to the atmosphere, recycled back into the dense barrier gas supply subsystem, mixed with fuel powering the compressor, and a combination thereof.

7. The mechanical seal system of claim 6, wherein the outlet is at least partially closed during the starting operation.

8. The mechanical seal system of claim 1, wherein the dense barrier gas is one of nitrogen, carbon dioxide, air, and a combination thereof.

9. The mechanical seal system of claim 1, further comprising a second stage seal including a rotating ring and a stationary ring.

10. The mechanical seal system of claim 1, wherein the mechanical seal system is a tandem, non-contacting dry gas sealing system.

11. A non-contacting, dry gas, tandem mechanical seal system having a starting mechanism configured to artificially provide an initial gap between interfacing portions of a first stage seal during a starting operation, the mechanical seal system comprising:
a first stage seal including a rotating ring operably coupled to a compressor shaft, and a stationary ring operably biased towards the rotating ring and operably coupled to a compressor housing, the rotating ring defining grooves that during normal operation are configured to pressurize gas passing between interfacing portions of the rotating ring and the stationary ring;
a dense barrier gas supply subsystem configured to direct a supply of dense barrier gas through the interfacing portions of the rotating ring and the stationary ring at a pressure below a process cavity pressure of a process cavity, during normal operation the grooves of the first stage seal configured to pressurize the dense barrier gas to a pressure above the process cavity pressure to promote an upstream flow of the dense barrier gas from an inner diameter of the first stage seat to an outer diameter of the first stage seat and into the process cavity and to maintain an interface gap between the interfacing portions of the rotating ring and the stationary ring; and
a starting mechanism configured to supply an additional supply of gas into the interfacing portions of the rotating ring and the stationary ring during a starting operation to artificially provide an initial gap between the interfacing portions until the rotating ring reaches a rotational speed at which the interface gap between the interfacing portions is sustainable.

12. The mechanical seal system of claim 11, wherein the starting mechanism includes a pressure balance line configured to enable a flow of process gas into the interfacing portions of the rotating ring and the stationary ring during the starting operation.

13. The mechanical seal system of claim 12, wherein the pressure balance line is closed after the starting operation.

14. The mechanical seal system of claim 11, wherein the starting mechanism includes an actuator configured to create a mechanical separation between the interfacing portions of the rotating ring and the stationary ring during the starting operation.

15. The mechanical seal system of claim 11, wherein the dense barrier gas supply subsystem includes a single inlet.

16. The mechanical seal system of claim 15, wherein the inlet is at least partially closed during the starting operation.

17. The mechanical seal system of claim 11, wherein the dense barrier gas supply subsystem includes a barrier gas outlet configured to enable the dense barrier gas to be one of vented to the atmosphere, recycled hack into the dense harder gas supply subsystem, mixed with fuel powering the compressor, and a combination thereof.

18. The mechanical seal system of claim 17, wherein the outlet is at least partially closed during the starting operation.

19. The mechanical seal system of claim 11, wherein the dense barrier gas is one of nitrogen, carbon dioxide, air, and a combination thereof.

20. A method of artificially providing, an initial gap between interfacing portions of a mechanical seal during a starting operation, the method comprising:
providing a direct supply of dense barrier gas through interfacing portions of a rotating ring and a stationary ring of mechanical seal at a pressure below a process cavity pressure, wherein during normal operation grooves defined by the mechanical seal are configured to pressurize the dense barrier gas to a pressure above the process cavity pressure of a process cavity to promote an upstream flow of the dense barrier gas from an inner diameter of the mechanical seal to an outer diameter of the mechanical seal and into the process cavity to maintain an interface gap between the interfacing portions of the rotating ring and the stationary ring; and
providing an additional supply of gas into the interfacing portions of the rotating ring and the stationary ring during the starting operation to artificially provide the initial gap between the interfacing portions until the rotating ring reaches a rotational speed at which the interface gap between the interfacing portions is sustainable.

21. A mechanical seal system for a compressor operating on a process gas in a process cavity at a process cavity pressure, the mechanical seal system comprising:
a mechanical seal including a rotating ring operably coupled to a compressor shaft, and a stationary ring operably biased towards the rotating ring by a biasing mechanism operably coupled to a compressor housing, the rotating ring defining grooves that during normal operation are configured to pressurize gas passing between interfacing portions of the rotating ring and the stationary ring to partially counteract a biasing force of the biasing mechanism;
a dense barrier gas supply subsystem configured to direct a supply of dense barrier gas from an inlet through the interfacing portions of the rotating ring and the stationary ring at a pressure below the process cavity pressure, during normal operation the grooves of the mechanical seal configured to pressurize the dense barrier gas to a pressure above the process cavity pressure to promote an upstream flow of the dense barrier gas from an inner diameter of the mechanical seal to an outer diameter of the mechanical seal and into the process cavity and to maintain an interface gap between the interfacing portions of the rotating ring and the stationary, ring; and
a starting mechanism configured to supply the process gas from inside the compressor into the interfacing portions of the rotating ring and the stationary ring during a starting operation to provide an initial gap between the interfacing portions until the rotating ring reaches a rotational speed at which the interface gap between the interfacing portions is sustainable.

22. The mechanical seal system of claim 21, wherein the starting mechanism includes a balance pressure line configured to enable the process gas to flow from inside the compressor into the interfacing portions of the rotating ring and the stationary ring during the starting operation.

23. The mechanical seal system of claim 22, wherein the pressure balance line is closed after the starting operation.

24. The mechanical seal system of claim 22, wherein the seal system is mounted around the compressor shaft and the pressure balance line is fluidly connected to the process cavity of the compressor.

25. The mechanical seal system of claim 21, wherein the dense barrier gas supply subsystem includes a single inlet.

26. The mechanical seal system of claim 25, wherein the inlet is at least partially closed during the starting operation.

27. The mechanical seal system of claim 21, wherein the dense barrier gas supply subsystem includes a harrier gas outlet configured to enable the dense barrier gas to be one of vented to the atmosphere, recycled back into the dense barrier gas supply subsystem, mixed with fuel powering the compressor, and a combination thereof.

28. The mechanical seal system of claim 27, wherein the outlet is at least partially closed during the starting operation.

29. The mechanical seal system of claim 21, wherein the dense barrier gas is one of nitrogen, carbon dioxide, air, and a combination thereof.

30. A method of operating a mechanical seal operation, the method comprising:

providing a direct supply of dense harrier gas to a harrier gas chamber in the seal and through interfacing portions of a rotating ring and a stationary ring of the mechanical seal at a pressure below a process cavity pressure of a process cavity, wherein during normal operation grooves defined by the mechanical seal are configured to pressurize the dense harrier gas to a pressure above the process cavity pressure to promote an upstream flow of the dense barrier gas from an inner diameter of the mechanical seal to an outer diameter of the mechanical seal and into the process cavity to maintain an interface gap between the interfacing portions of the rotating ring and the stationary ring;

reducing an amount of the dense barrier gas supplied to the harrier gas chamber;

providing an additional supply of process gas into the interfacing portions of the rotating ring and the stationary ring to provide the interface gap between the interfacing portions when the rotating ring is below a rotational speed at which the interface gap between the interfacing portions is sustainable.

\* \* \* \* \*